US008421668B2

(12) United States Patent
Ammar

(10) Patent No.: US 8,421,668 B2
(45) Date of Patent: Apr. 16, 2013

(54) SUB-MILLIMETER WAVE RF AND ULTRASONIC CONCEALED OBJECT DETECTION AND IDENTIFICATION

(75) Inventor: Danny F. Ammar, Windermere, FL (US)

(73) Assignee: Stalix LLC, Orlando, FL (US)

( * ) Notice: Subject to any disclaimer, the term of this patent is extended or adjusted under 35 U.S.C. 154(b) by 1175 days.

(21) Appl. No.: 12/233,446

(22) Filed: Sep. 18, 2008

(65) Prior Publication Data

US 2013/0050007 A1   Feb. 28, 2013

Related U.S. Application Data

(60) Provisional application No. 61/046,609, filed on Apr. 21, 2008.

(51) Int. Cl.
*G01S 13/00* (2006.01)

(52) U.S. Cl.
USPC .............................. 342/22; 342/176; 342/192

(58) Field of Classification Search ...................... 342/22
See application file for complete search history.

(56) References Cited

U.S. PATENT DOCUMENTS

| 6,777,684 B1* | 8/2004 | Volkov et al. ............. 250/341.1 |
| 2003/0163042 A1 | 8/2003 | Salmon ......................... 600/436 |
| 2004/0174289 A1* | 9/2004 | Singh et al. ..................... 342/22 |
| 2006/0273255 A1* | 12/2006 | Volkov et al. ............... 250/336.1 |
| 2007/0211922 A1* | 9/2007 | Crowley et al. ............... 382/115 |
| 2008/0304044 A1* | 12/2008 | Cooper et al. ................ 356/5.15 |
| 2009/0041292 A1* | 2/2009 | Daly et al. ..................... 382/100 |
| 2009/0212988 A1* | 8/2009 | Jung et al. ....................... 342/22 |
| 2010/0141502 A1* | 6/2010 | Cardiasmenos et al. ........ 342/22 |

FOREIGN PATENT DOCUMENTS

WO   WO 2007/054685 A2   5/2007

* cited by examiner

*Primary Examiner* — Timothy A Brainard
(74) *Attorney, Agent, or Firm* — King & Spalding LLP

(57) ABSTRACT

Active and passive sub-millimeter wave RF and ultrasonic systems can be used to detect a concealed object, such as an object concealed under the clothing of a subject, and identify material properties of the object. A concealed object detection system can include an antenna configured to receive an RF signal in the sub-millimeter wave range, the RF signal having been emitted by an object, a detector configured to convert the RF signal into an electrical signal, a signal integrator configured to integrate the electrical signal and provide an integrated signal over an observation period and a processor configured to extract object information from the integrated signal. An object indication device provides an indication of a detected object and material properties of the detected object based on the extracted object information. The extracted object information can include object image data and object material identification data.

10 Claims, 4 Drawing Sheets

SUB-MILLIMETER WAVE RF AND ULTRASONIC CONCEALED OBJECT DETECTION AND IDENTIFICATION

CROSS-REFERENCE TO RELATED APPLICATIONS

This application claims priority from U.S. Provisional Application Ser. No. 61/046,609, filed Apr. 20, 2008, the disclosure of which is hereby incorporated by reference in its entirety.

BACKGROUND

1. Field

The subject matter presented herein relates to detecting concealed objects in an obscuring medium and identifying material properties of the object using sub-millimeter wave (sub-MMW or SMMW) radio frequency (RF) and ultrasonic systems and methods.

2. Description of Related Art

Known techniques for locating and identifying concealed objects, such as contraband, explosives or hazardous material, when such concealed objects are located within an obscuring medium, such as clothing, can have limitations. Metal detectors can be ineffective in preventing some concealed objects from being detected, for example, if the objects are made of plastic or liquid materials.

Known systems using millimeter wave (MMW) frequencies can penetrate clothing, thus allowing the detection of hidden objects. However, MMW frequency bands below 100 GHz can have use restrictions, such as limited bandwidth availability to use in people screening applications for concealed objects. In addition, known MMW chips can have inherently narrow bandwidths. The narrow bandwidth can affect the quality of the MMW images and limit the ability to identify hidden objects.

SUMMARY

In an exemplary embodiment, a passive system, e.g., receive only, for detecting an object in a target area and identifying material properties of the object comprises at least one antenna configured to receive an RF signal in the sub-millimeter wave range, the RF signal having been emitted by an object in the target area; a detector configured to convert the RF signal into an electrical signal; a signal integrator configured to integrate the electrical signal and provide an integrated signal over an observation period; a processor configured to extract object information from the integrated signal; and an object indication means for providing an indication of a detected object and material properties of the detected object based on the extracted object information, wherein the extracted object information is at least one of object image data and object material identification data.

In another exemplary embodiment, an active system for detecting an object in a target area and identifying material properties of the object comprises a frequency synthesizer configured to generate signals in a wideband spectrum, the signals having a Frequency Modulated Continuous Wave waveform; a transmitter configured to amplify the signals; at least one transmit antenna configured to transmit the signals; at least one receive antenna configured to receive reflected signals, the reflected signals having been reflected by an object in the target area; a receiver configured to amplify the reflected signals; a processor configured to extract object information from the reflected signals; and an object indication means for providing an indication of a detected object and material properties of the detected object based on the extracted object information, wherein the extracted object information is at least one of object image data and object material identification data.

In another exemplary embodiment, a method of detecting an object on a subject and identifying material properties of the object comprises receiving signals emitted by an object on a subject, the signals being RF signals in the sub-millimeter wave range; processing the received signals using at least one of a fast Fourier transform and a hyperspectral imaging technique to extract object information from the received signals; detecting the object based on the extracted object information; creating an image of the detected object based on the extracted object information; identifying material characteristics of the detected object based on the extracted object information; and displaying at least one of the created image of the detected object and the identified material characteristics of the detected object.

In another exemplary embodiment, a method of detecting an object on a subject comprises transmitting signals in a screening area wherein at least one subject having an associated object is to be screened, the transmitted signals being in a wideband spectrum and having a Frequency Modulated Continuous Wave waveform; receiving reflected signals from the object when the object is located within the screening area; processing the reflected signals using at least one of a fast Fourier transform and a hyperspectral imaging technique to extract object information from the reflected signals; detecting the object based on the extracted object information; creating an image of the detected object based on the extracted object information; identifying material characteristics of the detected object based on the extracted object information; and displaying at least one of the created image of the detected object and the identified material characteristics of the detected object.

BRIEF DESCRIPTION OF THE DRAWINGS

As will be realized, different embodiments are possible, and the details disclosed herein are capable of modification in various respects, all without departing from the scope of the claims. Accordingly, the drawings and descriptions are to be regarded as illustrative in nature and not as restrictive. Like reference numerals have been used to designate like elements.

DETAILED DESCRIPTION

Figure 1:
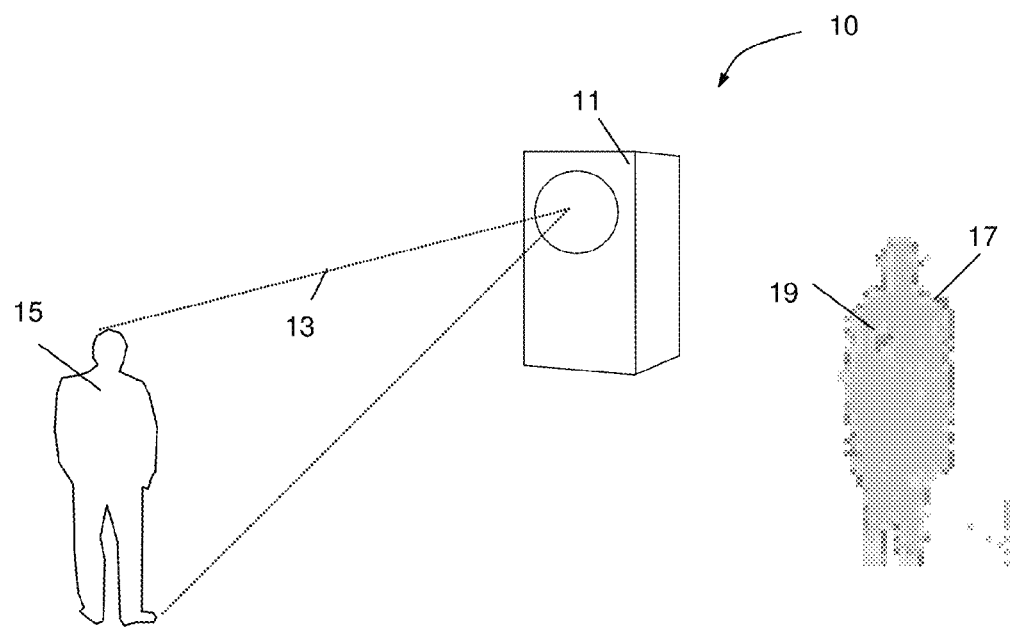
FIG. 1 shows an example of a known passive millimeter wave imaging system.

FIG. 1 shows an example of a known passive (receive only) millimeter wave (MMW) people screening system. Passive sensors can simply observe and report what they detect in their local environment. In the radio frequency (RF) spectral range, natural surfaces emit different amounts of radiation depending on parameters, such as temperature and emissivity, for example. The passive system 10 can include an imaging camera 11 that senses the MMW energy 13 emitted by a human subject 15 and creates a MMW image 17. A hidden object 19 under the subject's clothing can be detected by observing the contrast between the returns from the body and those from the hidden object.

Figure 2:
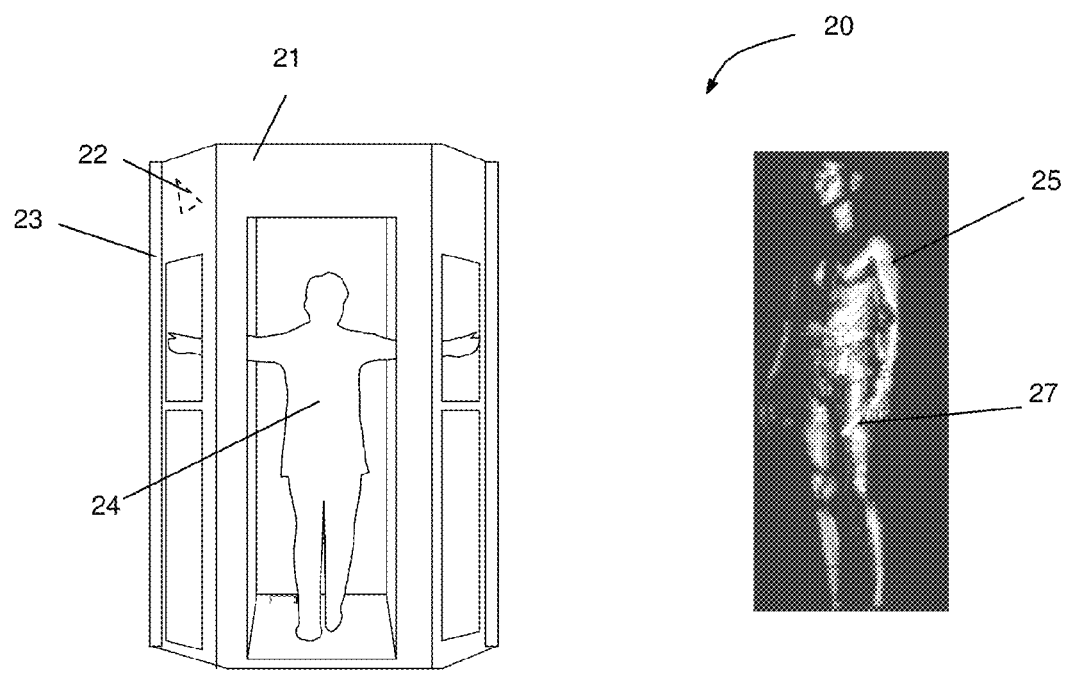
FIG. 2 shows an example of a known active millimeter wave imaging system.

FIG. 2 shows an example of a known active MMW people screening system. Active sensors, in contrast to passive sensors, can stimulate the environment by generating and emitting known signals. These signals can propagate out to the objects or targets of interest, interact with them, and reflect or scatter energy back to the sensor. The active system 20 can include a portal 21 that can include one or more MMW transmitters 22 and receivers 23 inside the enclosure that are used to illuminate a subject 24 with MMW energy and collect and create an image 25. A hidden object 27 under the subject's clothing can be detected by observing the contrast between the returns from the body and those from the hidden object.

In both types of MMW screening methods (passive and active), the object can be detected from the contrast between the returns from the body and those from the hidden object, but there may not be any information available about the type of hidden object. For example, there may not be a way to distinguish between a cell phone or a PDA or a plastic explosive.

Disclosed herein are exemplary systems and methods for detecting and identifying the material composition of concealed objects, for example, objects concealed under clothing of a subject, based on sub-MMW and ultrasonic technologies. The exemplary sub-MMW systems can operate at high frequencies, for example, above 100 GHz. The exemplary systems can operate in either passive or active modes with bandwidth of 10 GHz or greater. The exemplary ultrasonic systems can operate at frequencies, for example from 20 KHz to 500 MHz. The frequency of the sensor can be chosen based on several factors, including size, amount of penetration and propagation range. The exemplary systems can detect objects concealed on a subject.

Figure 3:
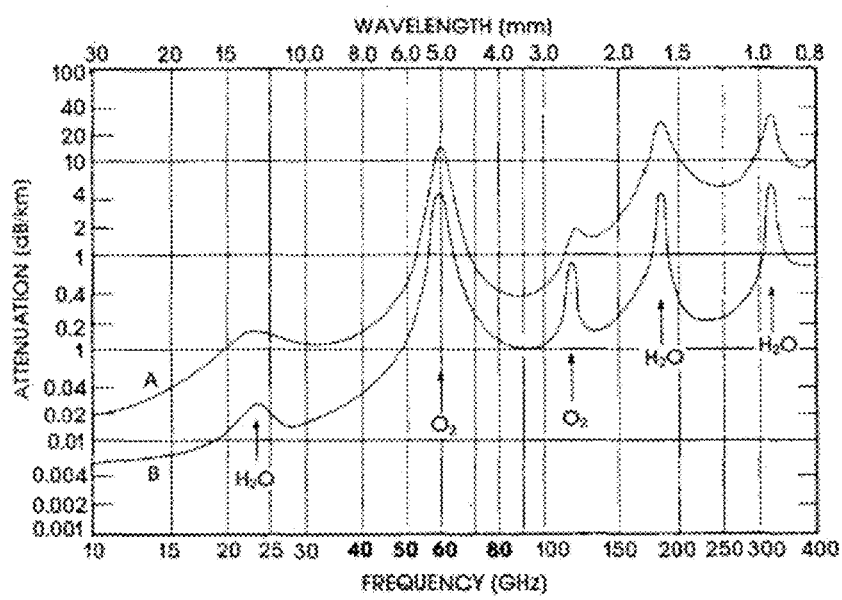
FIG. 3 shows a graph of atmospheric attenuation for electromagnetic radiation.

Microwave radiation wave lengths can range from about 1 mm to about 1 meter. FIG. 3 shows that optimum (low propagation loss) MMW electromagnetic radiation windows occur at 35 GHz, 94 GHz, 140 GHz and 220 GHz. The choice of frequency can depend on specific applications. The sub-MMW region, for example, between 200 and 300 GHz, can be optimum from the standpoint of attenuation losses and available bandwidth.

Figure 4:
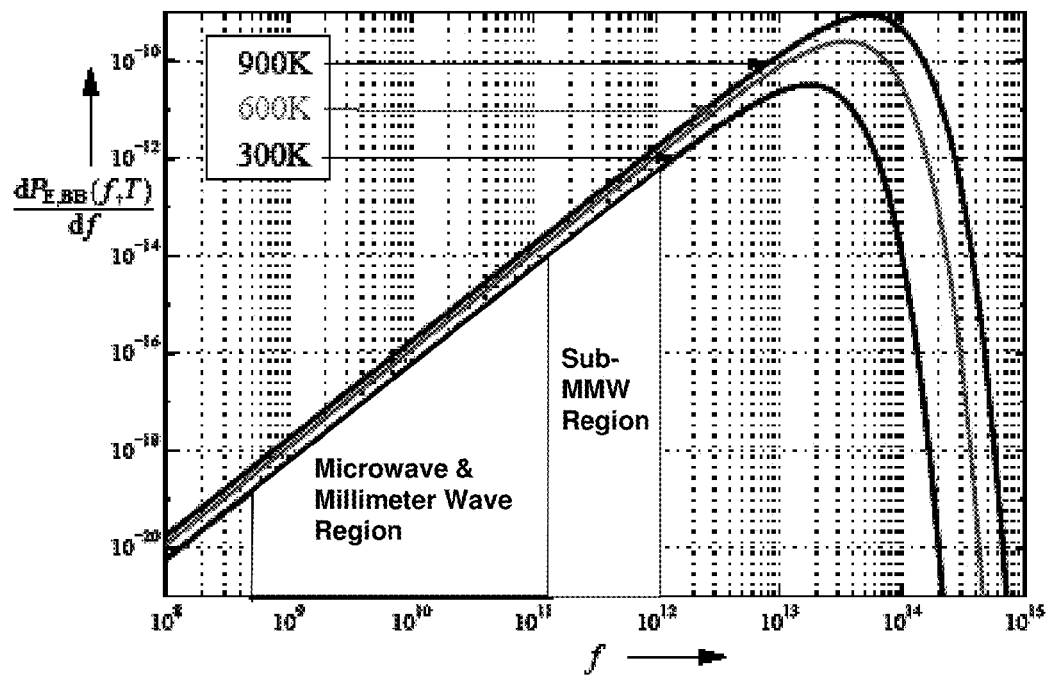
FIG. 4 shows a graph of Planck's emissivity at various target temperatures.

Planck's law states that the rate at which radiation is emitted by a blackbody depends on the absolute temperature of the blackbody and the specific wavelength (or frequency) of the radiation. It can equate the amount of emitted radiation at a wavelength with an absolute temperature. For example, FIG. 4 shows that at 300K, the amount of radiation emitted in the MMW range (20 to 100 GHz) is about $10^5$ to $10^8$ times smaller than the amount emitted in the infrared range. Known MMW receivers amplify RF signals on the order of $10^5$ times to generate enough energy for the MMW detectors. In addition to the amplification, a need for some temperature contrast can be involved to be able to detect the presence of concealed objects against the human body. In the sub-millimeter wave regions, for example, 100-300 GHz, the amount of radiation may be about $10^2$ to $10^4$ times smaller than the amount emitted in the infrared region. Operating in the sub-MMW (100 to 300 GHz) region can make it possible to achieve passive imaging comparable in performance with current infrared systems without relying on large signal amplification (<100 times) or contrast for enhancements.

High frequency semiconductor technology can be applied to the design of MMICs, for example, that work in the sub-MMW range. For example, sub-MMW 0.07 μm MMIC chips operating at frequencies approaching 300 GHz are available.

Figure 5:
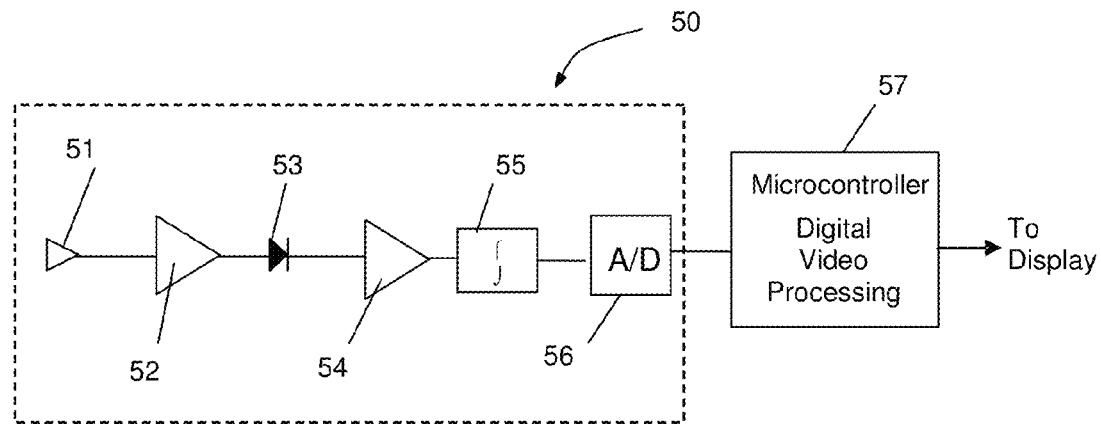
FIG. 5 shows a block diagram of an exemplary passive sub-MMW system.

An exemplary embodiment involves the use of a passive array of sub-MMW sensors configured within a detection system, such as a focal plane array camera, a portal or other imaging devices. FIG. 5 shows an exemplary array sensor 50, which can include an antenna 51, such as a feedhorn, to collect the SMMW energy, an RF amplifier stage 52, a detector, such as a detector diode 53 to convert the RF energy into a direct current (DC) form, a DC amplifier 54, a signal integrator 55 and an analog-to-digital converter (A/D) 56. Signal integration can be done by known analog or digital methods. The sensors can capture energy in the sub-MMW region and convert it to an electrical signal. This signal can then be converted into a digital format and processed by the microprocessor 57 to generate, for example, multi-pixel images on a display. The images can then be used to detect the presence of concealed objects and to identify their material type. Known techniques, such as pixel thresholding, nearest neighbor, size and 2D constant false alarm rate (CFAR) can be used for detection and material identification Millimeter wave (MMW) signals and ultrasonic signals can penetrate certain materials better than infrared or visible waves. Sensing in these bands can allow for the penetration of dielectrics, such as plastic and cloth, and can allow the detection of hidden objects. The properties of materials can have an impact on the applicability of particular sensing systems. For example, in the terahertz band, solids can have absorptions that can be assigned to vibrational modes. Solids may not have such absorptions in the MMW or sub-MMW bands (20-300 GHz) and information can be produced by differences in transmission, reflection and absorption. However, in materials of interest, such as plastic and liquid explosives, these differences can generate identifiable properties when collected over a wide spectrum in the sub-MMW range or ultrasonic range.

Hyperspectral or multi-spectral imagery is a term used to describe the imagery derived from subdividing the electromagnetic spectrum into very narrow bandwidths. Subdividing the spectra into distinct bins for imaging is known, for example, at IR frequencies. However, high bandwidth sub-MMW MMIC chips approaching 500 GHz, for example, can allow sub-MMW hyperspectral imaging. Also, high bandwidth ultrasonic transducers approaching 500 MHz, for example, can allow ultrasonic hyperspectral imaging.

In hyperspectral imaging, multiple images of a scene can be created using energy from narrow frequency bands. These narrow band images may be combined with or subtracted from each other to form images with high information content that can be exploited for detailed analysis of a target. These hyperspectral images can contain much data, which can be extracted as object information. Such information can include object image data and object material identification data. However, interpreting the information can involve an understanding of the features being extracted, and how they relate to the measurements made by the sensor.

Hyperspectral imaging can be implemented as a passive technique, but active systems in the sub-MMW and ultrasonic can also be used. The use of active hyperspectral sensors can reduce external environmental influences and optimize polarization. Polarization diversity, in which fixed polarizations are transmitted (horizontal, vertical or circular), can be used to enhance the detection process. The active sensor's ability to control polarization and illumination angle can be exploited to improve detection and discrimination.

"Spectromillimetry" is a term that will be used here for an exemplary technique that combines sub-MMW (100 to 300 GHz) spectroscopy and imaging technologies for detecting and identifying, for example, concealed explosive materials and devices.

Figure 6:
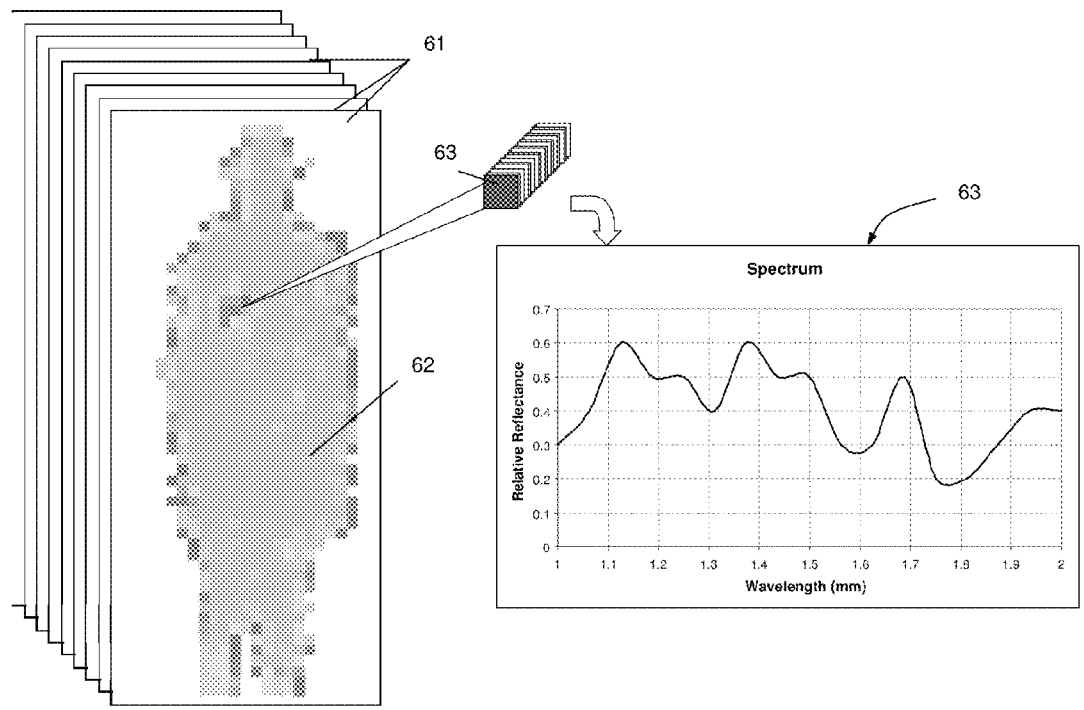
FIG. 6 shows an example of multi-spectral imaging of a subject with a concealed object.

FIG. 6 shows an exemplary hyperspectral imaging concept, where multiple images 61 of a subject 62 can be created using energy from narrow frequency bands. Each of the images can be created by collecting data from the scene by using a small part of the available bandwidth. Using the sub-MMW band with, for example, hundreds of GHz of available bandwidth, can allow the division of the available spectrum into a few GHz each. For example, if the available bandwidth is 100 GHz, it can be divided into sixteen 6.25 GHz sub-bands. Each one the sub-bands can provide adequate image resolution. The sixteen images can then be processed individually and collectively to extract information about the objects of interest and to identify their material properties. The concealed object can be detected by using, for example, contrast methods and pixel thresholding techniques implemented by automatic target recognition software known to persons of ordinary skill in the art.

After a hidden object is detected, the multi-spectral images can be processed to identify the material characteristics of the detected object using, for example, a spectral plot 63. Different material types can each generate a different spectrum. The measured spectra can be compared to pre-stored templates of material spectra to identify the material type. This exemplary spectromillimetry can be used with both passive and active sensing methods.

An exemplary active system can use a Frequency Modulated Continuous Wave (FMCW) radar sensor operating at sub-MMW or ultrasonic frequencies. Active sensors can allow higher target detection capability and higher resolution capability than passive sensors.

Radar, with its remote detection capabilities, can be a preferred electromagnetic sensor. Sub-MMW or ultrasonic features can be exploited by active sensors and can provide excellent capabilities for people screening applications, for example. Sub-MMW and ultrasonic antennas can offer the potential for generating high-resolution imagery from a conveniently small physical size.

Some fundamental relations for the resolution of an imaging system are known. For example, in the down-range dimension, resolution, r, can be related to the signal bandwidth B, as follows:

$$r = c/2B$$

Where B is the RF bandwidth and c is the speed of light for electromagnetic sensors and the speed of sound for ultrasonic sensors.

Figure 7:
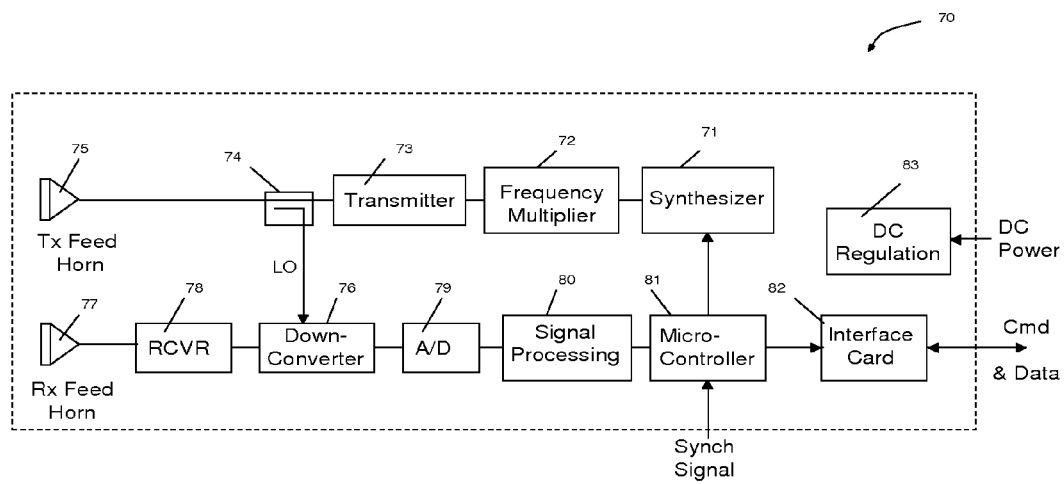
FIG. 7 shows a block diagram of an exemplary active sub-MMW system.

In one embodiment, an exemplary active system can use a wideband (tens of GHz bandwidth for electromagnetic sensors and hundreds of KHz for acoustic sensors) FMCW waveform to achieve sub-millimeter image resolution. FIG. 7 shows a block diagram of an exemplary embodiment of a sub-MMW radar sensor. The sensor 70 can include a frequency synthesizer 71 that generates a wideband frequency spectrum, a frequency multiplier 72 that multiplies the synthesized frequency to the sub-MMW band, a transmitter 73 to amplify the signal, a coupler 74 that splits the signal between the transmit (Tx) antenna or feedhorn 75, and the down converter 76.

Signals that are transmitted from the Tx antenna or feedhorn 75 can illuminate a scene with a subject and the reflected signals from the scene or subject can be captured by the receive (Rx) antenna or feedhorn 77 and sent to the receiver 78 for amplification. The amplified signals from the receiver can be down-converted to lower frequencies by the down converter 76 and can be sent to the analog-to-digital converter (A/D) 79 that converts them to digital format. The digital signals can then be processed by signal processor 80 to create the multi-spectral images. A micro-controller 81 can be used to synchronize the system operation and generate internal commands and communication. An interface card 82 can be used to communicate with external systems and to transfer image data to an external display (not shown). The sensor can also include a DC signal regulator and conditioner 83 to generate internal voltages.

Figure 8:
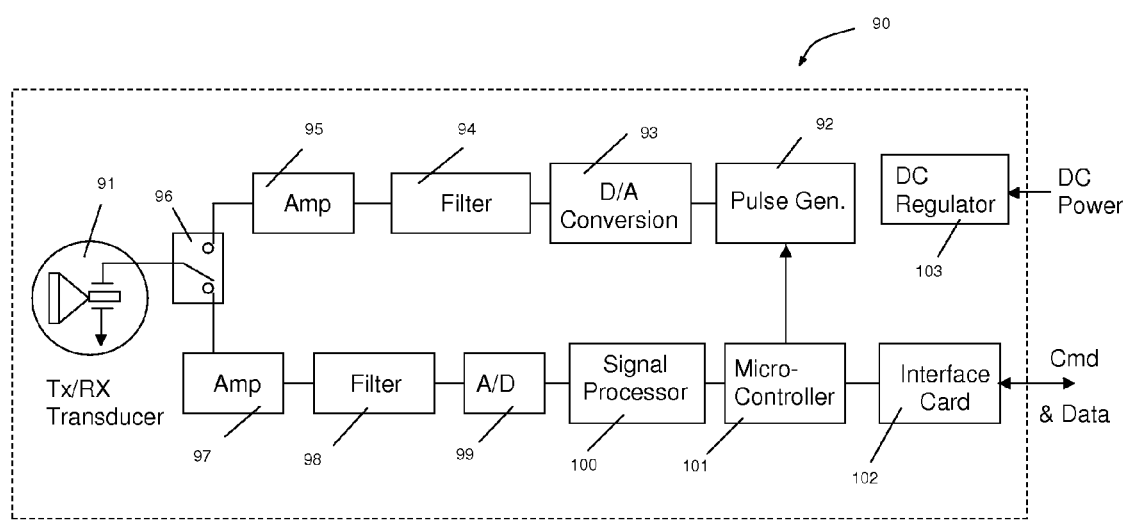
FIG. 8 shows a block diagram of an exemplary ultrasonic system.

FIG. 8 shows a block diagram of an exemplary pulse-echo mode sensor 90, where the ultrasonic transducer 91 acts as both an emitter and receiver. The ultrasonic transducer operates by applying a high voltage pulse, which can last for a short time, e.g., for a few microseconds, and then the system listens for the echoes for a short time, e.g., a few milliseconds, depending on the range of operation. The acoustic sensor 90 can include a digital pulse generator 92 that creates pulses at the desired frequency, pulse width and pulse repetition. The generated pulses can then be sent to a digital-to-analog converter 93 that transforms the digital pulses into analog signals. The analog signals can then be passed through a filter 94 to remove unwanted harmonics and spurious signals. The filtered signals can then be amplified by the transmitter amplifier 95 and passed on to a Transmit/Receive switch 96 that controls the flow of signals in and out of transducer 91.

In one embodiment, transducer 91 converts the electrical signals into acoustic waves that propagate to the target and a portion of the acoustic signal that is reflected from the target propagates back to the transducer. The reflected ultrasonic waves vibrate the piezoelectric crystal within the ultrasonic transducer 91 and generate voltages that can be amplified in the receiver amplifier 97. The amplified signals from the receiver can then be passed through filter 98 that removes unwanted signals and noise. The filtered signals can then be sent to the analog-to-digital converter (A/D) 99 that converts them to digital format. The digital signals can then be processed by signal processor 100 to extract amplitude, phase and other characteristics that can be used for creating images and detecting concealed objects.

A micro-controller 101 can be used to synchronize system operation and generate internal commands and communication. An interface card 102 can be used to communicate with external devices and to transfer image data to an external display (not shown). The sensor can also include a DC signal regulator and conditioner 103 to generate internal voltages.

In an active multi-spectral embodiment, the use of Fourier transforms can be an efficient method for collecting and processing various spectra. Fourier transforms have been used in spectroscopy, for example. Fourier transforms can also be used in spectromillimetry as a technique whereby spectra can be collected based on measurements of the temporal coherence of a radiative source, using time-domain measurements of the electromagnetic or ultrasonic radiation. There are several known methods for measuring the temporal coherence of the energy source, including the continuous wave and the pulsed Fourier transform spectrograph.

Collecting multi-spectral information about a target is an example of a technique disclosed herein to improve target recognition performance. Exemplary embodiments can exploit the concept of looking in several widely spaced sub-MMW and ultrasonic spectrums to generate complementary information.

Disclosed herein are exemplary sub-MMW and ultrasonic systems and methods that can be used to detect, locate and identify concealed objects within an obscuring medium, such as clothing. The methods of detection can include proximity and remote sensing, and imaging and non-imaging techniques. The exemplary systems and methods can determine dimensional, surface, contour, image, properties, and/or other information about a concealed object through wideband sub-MMW or ultrasonic interrogation.

Electromagnetic or ultrasonic sensors can be used to collect data and create high resolution images of the subject from which concealed objects can be detected.

In passive mode, an exemplary system can include one or more passive receivers operating at sub-MMW frequencies. Each receiver can include an antenna or feedhorn to collect the energy, a transition from air to microstrip, an amplifier stage and a detector diode to convert the RF energy into a DC form. Multiple embodiments are possible, including staring and scanning focal plane arrays, linear arrays and portals.

In active mode, an exemplary system can be operated similar to, for example, radar in ultra-wide band mode or an ultrasonic sensor in ultra-wideband mode. Sensor signals can radiate a subject with a sweeping frequency waveform. The received echoes can then be digitized and used to construct 2D or 3D images. Multiple techniques, including fast Fourier transforms, can be used to construct the image. The images can then be analyzed for the presence of hidden objects using automatic target recognition software.

Another exemplary embodiment can include a method for identifying and classifying the concealed object material through its properties. Subdividing the spectra into distinct bins for imaging has been used at infrared frequencies. However, the emergence of high bandwidth sub-MMW and ultrasonic devices makes multi-spectra imaging at these frequencies possible. As disclosed herein, hyperspectral/multi-spectral imagery is an example of a technique for combining sub-MMW (100 to 300 GHz) or ultrasonic (20 KHz to 500 MHz) spectroscopy and imaging for detecting and identifying concealed objects and classifying their material type.

The above description is presented to enable a person skilled in the art to make and use the systems and methods described herein, and it is provided in the context of a particular application and its requirements. Various modifications to the embodiments will be readily apparent to those skilled in the art, and the generic principles defined herein may be applied to other embodiments and applications without departing from the spirit and scope of the claims. Thus, there is no intention to be limited to the embodiments shown, but rather to be accorded the widest scope consistent with the principles and features disclosed herein.

What is claimed is:

1. A passive system for detecting a concealed object located on a subject in a target area and identifying material properties of the object, comprising:
    at least one antenna configured to receive an RF signal having a frequency of 100 GHz or greater and a bandwidth of 10 GHz or greater, the RF signal having been emitted by the object in the target area;
    a detector configured to convert the RF signal into an electrical signal;
    a signal integrator configured to integrate the electrical signal and provide an integrated signal over an observation period;
    a processor configured to:
        receive the integrated signal;
        create an image of the concealed object for each of a plurality of pre-defined frequency bands within the bandwidth, based on the received integrated signal;
        process each of the created images individually and collectively to determine the presence of the concealed object;
        create a spectral plot of the object; and
        compare the spectral plot of the object to pre-stored templates of material spectra to identify material properties of the object; and
    a display for providing an indication of the object and the identified material properties of the object.

2. The system of claim 1, wherein the antenna is a feedhorn.

3. The system of claim 1, comprising: an analog-to-digital converter configured to convert the integrated electrical signal into a digital signal.

4. An active system for detecting a concealed object located on a subject in a target area and identifying material properties of the object, comprising:
    a frequency synthesizer configured to generate signals having a frequency of 100 GHz or greater and a bandwidth of 10 GHz or greater, the signals having a Frequency Modulated Continuous Wave waveform;
    a transmitter configured to amplify the signals;
    at least one transmit antenna configured to transmit the signals;
    at least one receive antenna configured to receive reflected signals, the reflected signals having been reflected by the object in the target area;
    a receiver configured to amplify the reflected signals;
    a processor configured to:
        receive the amplified reflected signal;
        create an image of the concealed object for each of a plurality of pre-defined frequency bands within the bandwidth, based on the received amplified reflected signal;
        process each of the created images individually and collectively to determine the presence of the concealed object;
        create a spectral plot of the object; and
        compare the spectral plot of the object to pre-stored templates of material spectra to identify material properties of the object; and
    a display for providing an indication of the object and the identified material properties of the object.

5. The system of claim 4, wherein at least one of the transmit antenna and receive antenna is a feed horn.

6. The system of claim 4, comprising: an analog-to-digital converter configured to convert the reflected signals into digital signals.

7. A method of detecting a concealed object on a subject and identifying material properties of the object, comprising:
    receiving signals emitted by an object on a subject, the signals being RF signals having a frequency of 100 GHz or greater and a bandwidth of 10 GHz or greater;
    processing the received signals to extract object information from the received signals;
    creating an image of the concealed object for each of a plurality of pre-defined frequency bands within the bandwidth, based on the extracted object information;
    processing each of the created images individually and collectively to determine the presence of the concealed object;
    creating a spectral plot of the object;

comparing the spectral plot of the object to pre-stored templates of material spectra to identify material characteristics of the object; and displaying at least one of the created images of the object and the identified material characteristics of the object.

8. The method of claim 7, wherein the object is concealed under clothing of the subject.

9. A method of detecting a concealed object on a subject and identifying material properties of the object, comprising:

transmitting signals in a screening area wherein at least one subject having an associated object is to be screened, the transmitted signals having a frequency of 100 GHz or greater and a bandwidth of 10 GHz or greater and having a Frequency Modulated Continuous Wave waveform;

receiving reflected signals from the object when the object is located within the screening area;

processing the reflected signals to extract object information from the reflected signals;

creating an image of the concealed object for each of a plurality of pre-defined frequency bands within the bandwidth, based on the extracted object information;

processing each of the created images individually and collectively to determine the presence of the concealed object;

creating a spectral plot of the object;

comparing the spectral plot of the object to pre-stored templates of material spectra to identify material characteristics of the object; and displaying at least one of the created images of the object and the identified material characteristics of the object.

10. The method of claim 9, wherein the object is concealed under clothing of the subject.

* * * * *